(12) United States Patent
Nir et al.

(10) Patent No.: US 12,169,984 B2
(45) Date of Patent: *Dec. 17, 2024

(54) TRAINING SET SUFFICIENCY FOR IMAGE ANALYSIS

(71) Applicant: MICROSOFT TECHNOLOGY LICENSING, LLC, Redmond, WA (US)

(72) Inventors: Oron Nir, Herzliya (IL); Royi Ronen, Tel Aviv (IL); Ohad Jassin, Tel Mond (IL); Milan M. Gada, Redmond, WA (US); Mor Geva Pipek, Giv'Atayim (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 900 days.

This patent is subject to a terminal disclaimer.

(21) Appl. No.: 17/157,427

(22) Filed: Jan. 25, 2021

(65) Prior Publication Data

US 2021/0174146 A1 Jun. 10, 2021

Related U.S. Application Data

(63) Continuation of application No. 15/977,517, filed on May 11, 2018, now Pat. No. 10,902,288.

(51) Int. Cl.
*G06V 10/70* (2022.01)
*G06F 18/21* (2023.01)
(Continued)

(52) U.S. Cl.
CPC .......... *G06V 40/173* (2022.01); *G06F 18/211* (2023.01); *G06F 18/2148* (2023.01);
(Continued)

(58) Field of Classification Search
None
See application file for complete search history.

(56) References Cited

U.S. PATENT DOCUMENTS

| 2010/0214430 | A1* | 8/2010 | De Boer | G02B 21/244 |
| | | | | 348/222.1 |
| 2014/0146640 | A1* | 5/2014 | Matsuoka | G02F 1/13338 |
| | | | | 367/95 |
| 2021/0232862 | A1* | 7/2021 | Inoshita | G06V 10/774 |

FOREIGN PATENT DOCUMENTS

EP 2672396 A1 * 12/2013 ........... G06F 16/583

OTHER PUBLICATIONS

Shah, "About Train, Validation and Test Sets in Machine Learning", https://tarangshah.com/blog/2017-12-03/train-validation-and-test-sets/, Dec. 2017 (Year: 2017).*

(Continued)

*Primary Examiner* — John B Strege
*Assistant Examiner* — Elisa M Rice
(74) *Attorney, Agent, or Firm* — Shook, Hardy & Bacon L.L.P.

(57) ABSTRACT

Aspects of the technology described herein improve an object recognition system by specifying a type of picture that would improve the accuracy of the object recognition system if used to retrain the object recognition system. The technology described herein can take the form of an improvement model that improves an object recognition model by suggesting the types of training images that would improve the object recognition model's performance. For example, the improvement model could suggest that a picture of a person smiling be used to retrain the object recognition system. Once trained, the improvement model can be used to estimate a performance score for an image recognition model given the set characteristics of a set of training of images. The improvement model can then select (Continued)

a feature of an image, which if added to the training set, would cause a meaningful increase in the recognition system's performance.

20 Claims, 9 Drawing Sheets

(51) Int. Cl.
*G06F 18/211* (2023.01)
*G06F 18/214* (2023.01)
*G06V 10/774* (2022.01)
*G06V 10/776* (2022.01)
*G06V 40/16* (2022.01)

(52) U.S. Cl.
CPC ............ *G06F 18/217* (2023.01); *G06V 10/70* (2022.01); *G06V 10/774* (2022.01); *G06V 10/776* (2022.01); *G06V 40/175* (2022.01)

(56) References Cited

OTHER PUBLICATIONS

"Office Action Issued in European Patent Application No. 19724050.0", Mailed Date: Nov. 4, 2022, 8 Pages.

Communication pursuant to Article 94(3) Received in European Patent Application No. 19724050.0, mailed on Jun. 26, 2024, 7 pages.

* cited by examiner

TRAINING SET SUFFICIENCY FOR IMAGE ANALYSIS

CROSS-REFERENCE TO RELATED APPLICATIONS

This application is a continuation of U.S. patent application Ser. No. 15/977,517, filed on May 11, 2018, titled "Training set sufficiency for image analysis" the entirety of which is hereby incorporated by reference.

BACKGROUND

Technology exists for computers to classify images. Generally, a computer classifier is trained using labeled image data. For example, a person's face could be submitted with the name of the person. The label for each image corresponds to an object in the image, such as the person. Conceptually, the training data is input to the model, which makes adjustments to nodes within the model until the predicted outcome from the model matches the label. Once trained, the image classifier can assign a label to an unlabeled image.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein improve an object recognition system by specifying a type of picture that would improve the accuracy of the object recognition system if used to retrain the object recognition system. For example, in the context of facial recognition, the technology described herein could suggest that a picture of a person smiling be used to retrain the object recognition system. The technology described herein can take the form of an improvement model that improves an object recognition model by suggesting the types of training images that would improve the object recognition model's performance.

It is a challenge to know what type of additional training data will provide the biggest performance gain or even a meaningful gain. For example, providing ten nearly identical pictures of a person smiling may provide less improvement to the recognition system's accuracy than a single photo of the person wearing glasses. The present technology can suggest the type, or types, of picture(s) that will most improve the image classifying system's ability to recognize an object. The type of picture can be defined by a feature of the object shown, such as a person frowning, smiling, laughing, wearing a hat, not wearing a hat, and such. The type of picture can also be defined by characteristics of the image, such as resolution, size, exposure, etc.

Once trained, the improvement model can be used to estimate a performance score for an image recognition model given the set characteristics of a set of training of images. The improvement model can then select a feature of an image, which if added to the training set, would cause a meaningful increase in the performance score.

DRAWINGS

Aspects of the technology described herein are described in detail below with reference to the attached drawing figures, wherein.

DETAILED DESCRIPTION

Figure 1:
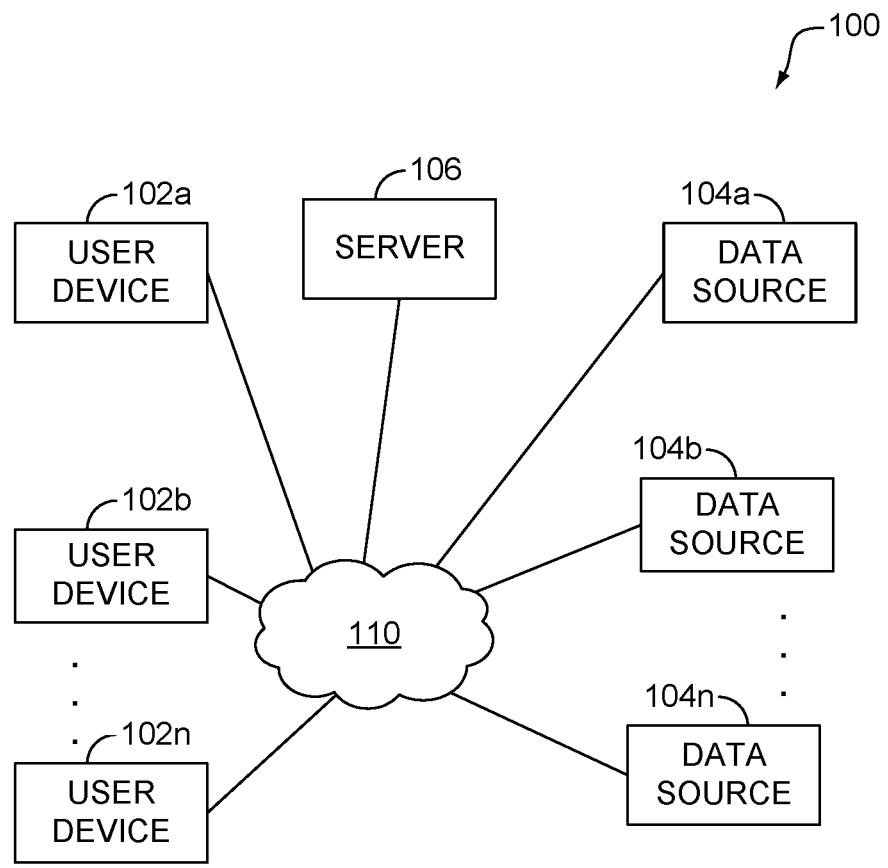
FIG. 1 is a block diagram of an example operating environment suitable for implementing aspects of the technology described herein.

The subject matter of aspects of the technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein improve an object recognition system by specifying a type of picture that would improve the accuracy of the object recognition system if used to retrain the object recognition system. For example, in the context of facial recognition, the technology described herein could suggest that a picture of a person smiling be used to retrain the object recognition system. The technology described herein can take the form of an improvement model that improves an object recognition model by suggesting the types of training images that would improve the object recognition model's performance.

Different types of object recognition systems exist, and an object recognition system will be described in more detail subsequently. At a high level, an object recognition system is trained to recognize images by feeding it labeled images of an object to be recognized. Once trained, the system can recognize objects in unlabeled images. Improving the training data can improve the object recognition system's performance.

However, it is a challenge to know what type of additional training data will provide the biggest performance gain or even a meaningful gain. For example, providing ten nearly identical pictures of a person smiling may provide less improvement to the recognition system's accuracy than a single photo of the person wearing glasses. The present technology can suggest the type, or types, of picture(s) that will most improve the image classifying system's ability to recognize an object. The type of picture can be defined by a feature of the object shown, such as a person frowning, smiling, laughing, wearing a hat, not wearing a hat, and such. The type of picture can also be defined by characteristics of the image, such as resolution, size, exposure, etc. In one aspect, suggestions are limited to image characteristics that a user can easily recognize in an image. In another aspect, the suggestion is not limited. The limits on suggestions can be changed by user preference. For example, different modes can be associated with different suggestion complexity levels. An expert mode may have no constraints, while an easy mode limits suggestions to only easily identified image characteristics, such as smiling, frowning, wearing glasses, etc.

In one aspect, the technology described herein is used to improve a custom facial recognition system that can be used to recognize people in images or videos. For example, a user may wish to train a system to recognize family members in personal videos or images. Initially, a user can provide one or more training images or videos of a person to train the customized model. Videos of people may be sampled to generate a series of training images. As mentioned, the training images are associated with labels identifying the person or people in an image/video. Once trained, the object recognition model can identify a person in a new image. The identification may be associated with a confidence score or some other measure the model uses to determine how well the new image matches expected characteristics of the person.

The same training images can be analyzed by an improvement model to determine a likelihood that the customized object recognition model will accurately identify the person in an unlabeled image. The improvement model can take the form of the decision tree, a random decision forest model, or some other model. The improvement model is able to estimate the effectiveness of the training images without directly testing the object recognition model trained on the training images. Once effectiveness is calculated, images of one or more characteristics that would improve the confidence factor can be identified using the improvement model. The user is then asked to submit a picture that includes the identified feature.

The improvement model is trained using a plurality of image feature sets and corresponding confidence scores. The image feature sets (also called "set characteristics" herein) include characteristics of a group of images used as training data for the object recognition model. The image feature set is generated by running a training set of images for a person through the object recognition model to train the model. The object recognition model is then fed a plurality of unlabeled validation images of the person. For each unlabeled image, the object recognition model outputs a confidence factor, or other performance measure, describing a probability that the image includes the person. An average confidence score can be calculated for the feature set by combining the confidence score generated for each unlabeled validation image. The average confidence scores are associated with each of the characteristics in the feature image set. This process is repeated with images of multiple users until a group of image feature sets and corresponding confidence scores is generated.

The plurality of feature sets is then analyzed to build an improvement model. Once trained, the improvement model can be used to estimate a performance score for an image recognition model given the set characteristics of a set of training of images. The improvement model can then select a feature of an image, which if added to the training set, would cause a meaningful increase in the performance score. In one aspect, the improvement model is a random decision forest model.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; remote server 106; and network 110. It should be understood that environment 100 shown in FIG. 1 is an example of one suitable operating environment. Each of the components shown in FIG. 1 may be implemented via any type of computing device, such as computing device 900 described in connection to FIG. 9. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. The user devices can send and receive communications including images, generate images, and store images. These images can be transferred to a data source 104, which may be a local data store, a social media data store, or remote data store. The user devices 102 can generate user interfaces that are used to control other components, including server 106 components. The user device can provide an interface, such as interface 500, that includes instructions for the user to improve the object recognition system by uploading an additional training image having a particular characteristic. The user device 102 can be a source of user information, such as a location information (e.g., GPS), calendar information, communication information, and other metadata that may be processed with images, in some aspects.

User devices 102a and 102b through 102n may comprise any type of computing device capable of use by a user. For example, in one aspect, user devices 102a through 102n may be the type of computing device described in relation to FIG. 9 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Server 106 can comprise server-side software designed to work in conjunction with client-side software on user devices 102a and 102b through 102n to implement any combination of the features and functionalities discussed in the present disclosure. For example, the server 106 may run an object recognition system, such as object recognition model 260, which identifies objects, such as people, in images. The server 106 can also host all or part of the model improvement system 240. The server 106 may operate in a data center and comprise multiple hardware devices for operating the model, including a plurality of graphics processing units (GPU), which may be described as a GPU farm. This division of operating environment 100 is provided to illustrate one example of a suitable environment, and there is no requirement for each implementation that any combination of server 106 and user devices 102a and 102b through 102n remain as separate entities.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) images to the model improvement system 240 of FIG. 2.) Data sources 104a and 104b through 104n may be discrete from user devices 102a and 102b through 102n and server 106 or may be incorporated and/or integrated into at least one of those components. The data sources 104a through 104n can comprise image hosting services, social networks, cloud storage, or other data sources.

Figure 2:
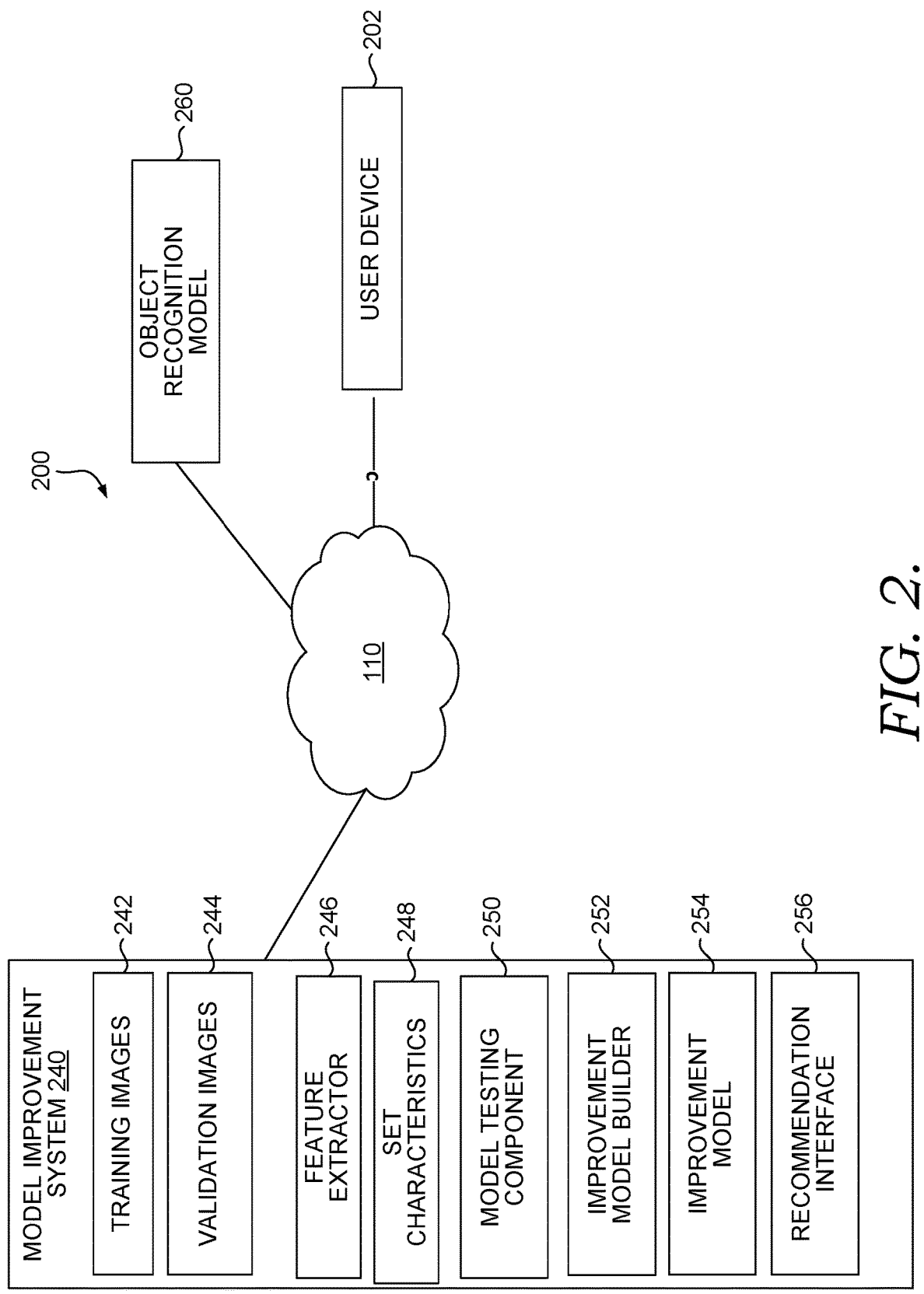
FIG. 2 is a diagram depicting an example computing architecture suitable for implementing aspects of the technology described herein.

Operating environment 100 can be utilized to implement one or more of the components of system 200, described in FIG. 2.

Referring now to FIG. 2, with FIG. 1, a diagram is provided showing aspects of an example computing system architecture suitable for implementing an aspect of the technology described herein and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including model improvement system 240, object recognition model 260, and user device 202. Object recognition model 260 and model improvement system 240 (including its components 242, 244, 246, 248, 250, 252, 254, and 256) may be embodied as a set of compiled computer instructions or functions, program modules, computer software services, or an arrangement of processes carried out on one or more computer systems, such as computing device 900 described in connection to FIG. 9.

Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in example system 200, it is contemplated that in some aspects, functionality of these components can be shared or distributed across other components.

The model improvement system 240 generates a recommendation to improve the object recognition model 260 by retraining the model with an image having a specific characteristic. The object recognition model 260 receives images and attempts to identify an object, such as a person in the image. If an object is recognized, then the object recognition model provides the recognized object as input. The object recognition model 260 is trained using images of an object to be recognized.

In one aspect, the object recognition model is a neural network. As used herein, a neural network comprises at least three operational layers. The three layers can include an input layer, a hidden layer, and an output layer. Each layer comprises neurons. The input layer neurons pass data to neurons in the hidden layer. Neurons in the hidden layer pass data to neurons in the output layer. The output layer then produces a classification. Different types of layers and networks connect neurons in different ways.

Neurons have weights, an activation function that defines the output of the neuron given an input (including the weights), and an output. The weights are the adjustable parameters that cause a network to produce a correct output. The weights are adjusted during training. Once trained, the weight associated with a given neuron can remain fixed. The other data passing between neurons can change in response to a given input (e.g., image). Retraining the network with an additional training image can update one or more weights in one or more neurons.

The neural network may include many more than three layers. Neural networks with more than one hidden layer may be called deep neural networks. Example neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network). The training implementation described herein in association with FIG. 3 uses a convolutional neural network, but aspects of the technology are applicable to other types of multi-layer machine classification technology.

Figure 3:
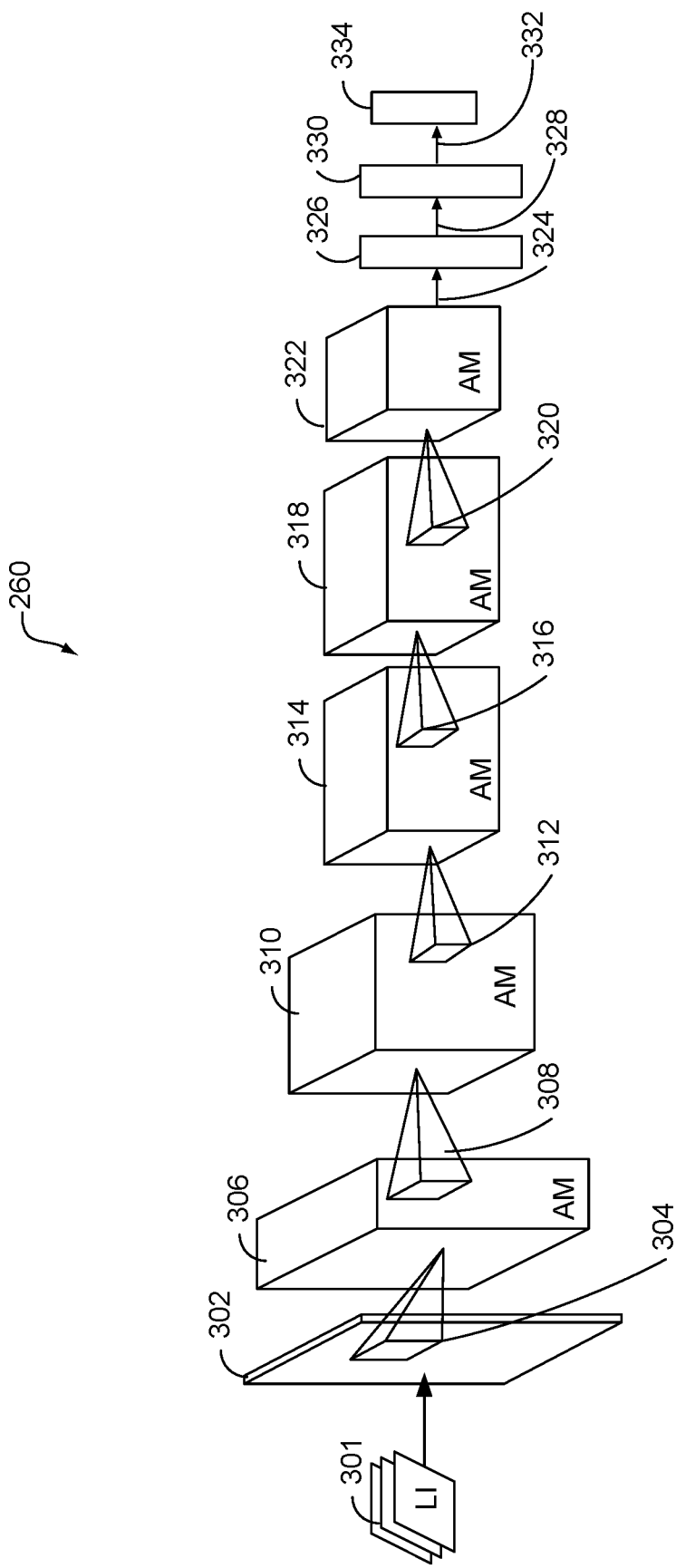
FIG. 3 is a diagram depicting an object recognition model, in accordance with an aspect of the technology described herein.

Turning now to FIG. 3, the training of an object recognition model 260 is depicted. The object recognition model 260 shown is a convolutional deep network, but other models can be used in aspects of the invention. The object recognition model 260 comprises an input layer 302, five convolutional layers (first convolutional layer 306, second convolutional layer 310, third convolutional layer 314, fourth convolutional layer 318, and fifth convolutional layer 322), and three fully connected layers (a first fully-connected layer 326, a second fully-connected layer 330, and an output layer 334). Aspects of the technology described herein are not limited to this arrangement.

The input layer converts the image into data that can be processed by the first convolutional layer 306. In one aspect, the input layer comprises three layered arrays. Each node in the array represents a pixel in the training image. Each array represents either red, green, or blue. In the red array, a node can be the intensity of red associated with the node's pixel. In this way, each pixel is represented by three nodes; one in each sub-layer within the input layer.

Initially, an image from the training images 242 is processed as input. The processing occurs the same way whether in training or production mode. The only difference is that the neuron weights in the model may be changed after a classification is produced while in training mode. In this example, the image can be 224×224 pixels. The depth of input layer 302 can be described as three because each pixel can have a red, green, and blue (RGB) pixel intensity value.

The first convolution layer 306 comprises multiple sublayers, described herein as feature maps. Each feature map (i.e., sublayer) can be associated with a different filter operation. The filter operation can be described as a neuron's activation function. The goal of the filter can be to detect low-level shapes in an image, such as a curve or line. Each filter operation works on a group of pixels in the image that can be described as a receptive field 304. Each neuron in a sublayer has a different receptive filed. The output of the filter operation combined with a weight assigned to a neuron can be the neuron's output. For example, a filter operation on a 5×5×3 receptive field 304 of the input layer 302 can produce a single value. When combined with the weight of the neuron, the result is the output of a single neuron in the first convolutional layer 306. This process is repeated for adjacent neurons in the feature map, which will each use a different receptive field. The process can also be repeated on the same receptive field 304 by each neuron in different feature maps within the convolutional layer using the filter operation associated with the respective feature map.

If the receptive field contains a sought after feature (e.g., a curve, honeycomb shape, a triangle), then a different number would result than if it did not. For example, a filter operation that did not find a sought after feature could return a zero value in contrast to a value of 1000 if the feature in the image exactly matched a feature in the filter.

The feature map is populated by running the same filter operation over different receptive fields of the input layer 302, eventually processing the entire input layer 302. Sections of the input layer 302 to be mapped are determined by the stride selected. The stride is a distance between center pixels of adjacent receptive fields. The adjacent receptive fields are associated with adjacent neurons. A stride of one pixel would cause the adjacent receptive field to have a center pixel adjacent to a center pixel in the first receptive field 304. A stride of two would cause the center pixel of a receptive field to move over two pixels. Aspects of the technology can be used with different strides, such as a stride of 2, 4, or 6.

The first convolutional layer 306 comprises multiple feature maps; each feature map comprising an array or layer of neurons populated using the same filter operation. The first feature map can look for curves, the second feature map lines, the third feature map a blue color blob, and so on. Different weights can be calculated for each neuron during training. A convolutional layer with 48 feature maps can be said to have a depth of 48. The height and width dimensions will depend on the image size, receptive field size, and stride. For this example, the first convolutional layer 306 can have a height and width of 55.

Accordingly, the first convolutional layer 306 can comprise a plurality of feature maps. Each feature map can be a single dimensional array of numbers produced by a single filter operation on a group of pixels. The more filters used, the more feature maps the convolutional layer will contain. For example, using 48 filters will produce a first convolutional layer 306 having a depth of 48 different arrays.

The other convolutional layers can work in a similar fashion, with a receptive field of various dimensions in a prior layer mapping to a neuron in a subsequent layer. FIG. 3 depicts a neuron in the second convolutional layer 310 having a receptive field 308 in the first convolutional layer 306, a neuron in the third convolutional layer 314 having a receptive field 312 in the second convolutional layer 310, a neuron in the fourth convolutional layer 318 having a receptive field 316 in the third convolutional layer 314, and a neuron in the fifth convolutional layer 322 having a receptive field 320 in the fourth convolutional layer 318. The functions can be of different types in different layers, for example, pooling functions, rectified linear unit operations, and such.

For example, the second convolutional layer 310 can be a pooling layer that comprises neurons arranged in feature maps that perform a down sampling operation. A purpose of the pooling layer is to reduce the amount of data to process. Each neuron in the second convolutional layer 310 has a receptive field 308 in the first convolutional layer 306. For example, a neuron could have a receptive field of 2×2 neurons meaning it processes the output of those four neurons. In a pooling operation, the highest value of the four values produced by neurons in the 2×2 grid within the receptive field 308 can be selected by the activation function of a single neuron in the second convolutional layer 310. The output of this neuron can be the highest value adjusted according to the weight, if any, assigned to the neuron.

The output of the neurons in the fifth convolutional layer 322 is fed 324 to neurons in the first fully-connected layer 326. The output of every neuron in the first fully-connected layer 326 is output 328 to every neuron in the second fully-connected layer 330. The output of every neuron in the second fully-connected layer 330 is output 332 to every neuron in the output layer 334. The output layer 334 produces a classification. In one aspect, the classification is the highest score of a classification distribution of classes being classified. When an object recognition model is trained to recognize multiple objects, the classification can be into one of the known objects.

In each type of deep model, training is used to fit the model output to the training data. In particular, weights associated with each neuron in the model can be updated through training. Originally, the model can comprise random weight values that are adjusted during training. In one aspect, the model is trained using backpropagation. The backpropagation process comprises a forward pass, a loss function, a backward pass, and a weight update. This process is repeated for each training image. The goal is to update the weights of each neuron (or other model component) to cause the model to produce an output that maps to the correct label. The analogous training data comprises labeled analogous images 301. Each labeled image is input to the model and used to train it. Once a sufficient number of training images are fed to the object recognition model 260, then the training can stop. The object recognition model 260 can then be used to classify unlabeled images.

Testing the object recognition model 260 works in a similar fashion. A validation image is input to the input layer and the highest classification score output. The highest output score can also be the performance measure for the object recognition model 260 for the image. An overall performance measure can be calculated by averaging the output score across multiple validation images.

Returning to FIG. 2, the model improvement system 240 comprises training images 242, validation images 244, feature extractor 246, set characteristic component 248, model testing component 250, improvement model builder 252, improvement model 254, and recommendation interface 256. The flow of data through some of these components is also described with reference to FIG. 4.

The training images 242 comprise labeled images. The label corresponds to an object and/or characteristics of the object visibly depicted in the image. For example, an image of a cat could be labeled with a "cat" tag. Characteristics of the cat could include a cat breed, hair color, hair length, size, or activity. All of these characteristics could form separate labels for an image. Thus, an image can have multiple labels. The labels can be assigned by a human viewing the image. An image with multiple objects can have individual objects labeled. These labels can identify an area of the image that depicts the object associated with the label. As explained in more detail, the training images 242 are used to train an object recognition model 260 to recognize similar objects in unclassified images. For example, images of a cat can be used to train the model to recognize cats in other images.

In one aspect, the training images comprise sets of images. Each set can include multiple images of the same person. The sets can have the same number or different numbers of images. For example, one image set can have five images of a first person and a second set can have ten images of a second person. In all, the training images can include a large number of image sets, such as 20 sets, 50 sets, 100 sets, 500 sets, 1,000 sets, or more.

The validation images 244 are used to test the performance of the object recognition model after being trained on a set of images. The validation images depict the same people depicted in the training images 242. In one aspect, each training set is matched with a validation set. The validation set can have the same or a different number of images as a corresponding training set.

The feature extractor 246 analyzes an image to determine whether an image has one or more features 247. A feature can be many different things including points of interest on the face. The features can be identified using different methods, including machine learning. The facial features in an image can include face attributes and face landmarks. Face attributes include:

Age: an estimated "visual age" number in years. It is how old a person looks rather than the actual biological age.

Gender: male or female.

Smile: smile intensity can be expressed as a number between [0,1]. Zero may be no smile and 1 may be a large smile.

Facial Hair: return lengths in three facial hair areas: moustache, beard and sideburns. The length can be expressed as a number between [0,1] or some other scale. 0 for no facial hair in this area, 1 for long or very thick facial hairs in this area.

Head Pose: 3-D roll/yaw/pitch angles for face direction.

Glasses: glasses type. Values can include 'No Glasses', 'Reading Glasses', 'Sun glasses', and 'Swimming Goggles'.

Emotion: emotion intensity, including neutral, anger, contempt, disgust, fear, happiness, sadness and surprise.

Hair: group of hair values indicating whether the hair is visible, bald, and hair color if hair is visible.

Makeup: whether eye, lip areas are made-up or not.

Accessories: accessories around the face, including 'headwear', 'glasses', and 'mask'. Note, this is after a face is detected. A large mask could result in no face being detected.

Blur: whether the face is blurry or not. Can be expressed as a level, such as 'Low', 'Medium', or 'High'. Can also be expressed as a value between [0,1] or some other scale, the larger the blurrier.

Exposure: face exposure level. Can be expressed as a level, such as 'GoodExposure', 'OverExposure', or 'UnderExposure'.

Noise: noise level of face pixels. Can be expressed as a level, such as 'Low', 'Medium', and 'High'. Can also be expressed as a value between [0,1] or some other scale, the larger the noisier The feature extractor 246 can also identify facial landmarks in an image. The facial landmarks can include eyeLeftBottom.x, eyeLeftInner.x, eyeLeftOuter.x, eyeLeftTop.x, eyeRightBottom.x, eyeRightInner.x, eyeRightOuter.x, eyeRightTop.x, eyebrowLeftInner.x, eyebrowLeftOuter.x, eyebrowRightInner.x, eyebrowRightOuter.x, eyeLeftBottom.y, eyeLeftInner.y, eyeLeftOuter.y, eyeLeftTop.y, eyeRightBottom.y, eyeRightInner.y, eyeRightOuter.y, eyeRightTop.y, eyebrowLeftInner.y, eyebrowLeftOuter.y, eyebrowRightInner.y, and eyebrowRightOuter.y.

Other image data includes the file size.

The set characteristic component 248 builds set characteristics for a set of training images using the image characteristics for individual images in the training set. As mentioned, a training set is a group of images depicting the same person used to train the object recognition model 260. The set characteristics describe the entire set, rather than a single image.

Figure 4:
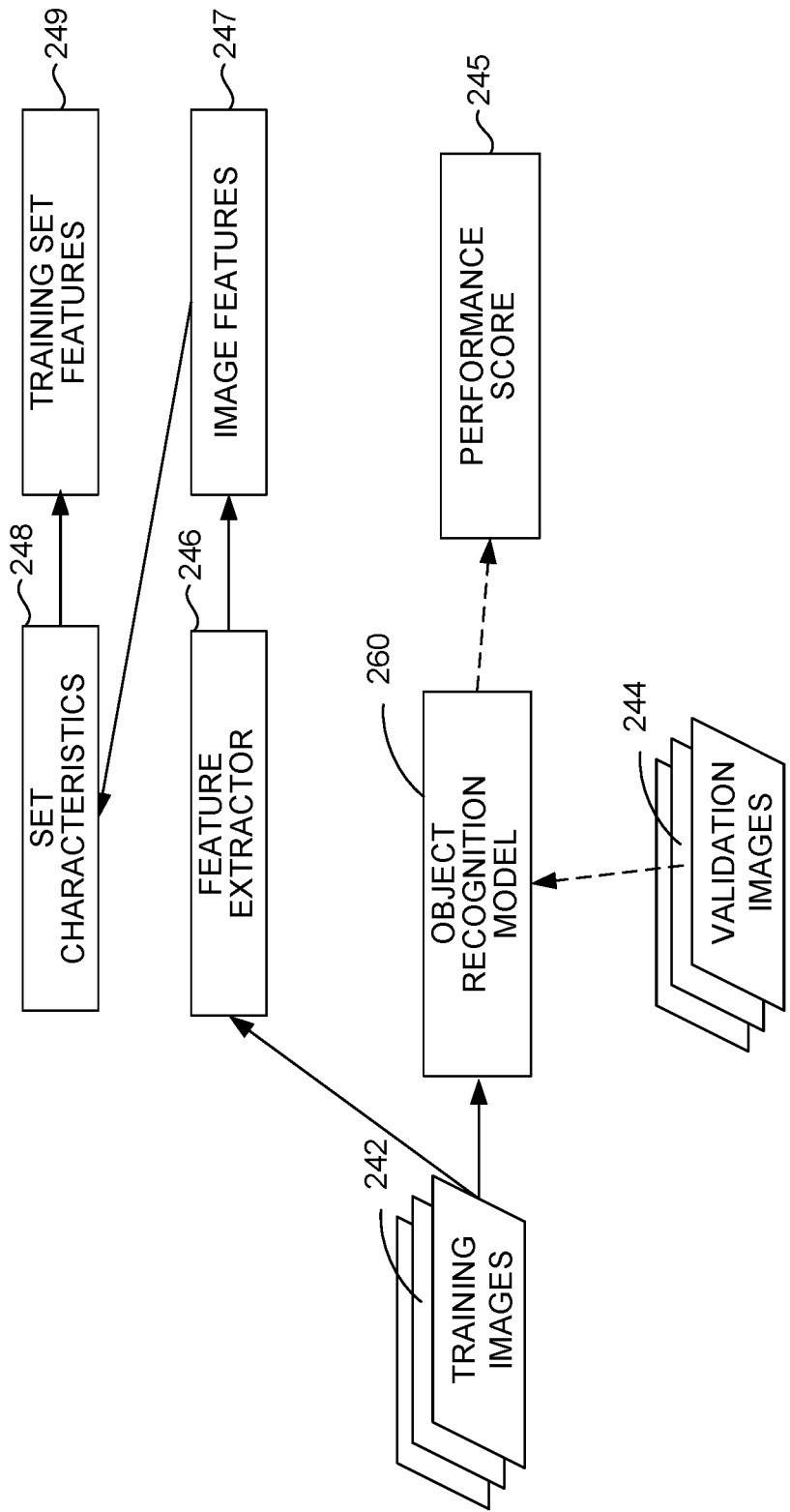
FIG. 4 is a diagram depicting an object recognition model, in accordance with an aspect of the technology described herein.

Various calculations can be performed on the image features to build the set characteristics 249 (see FIG. 4). For example, the coefficient of variation, variance, mean value, maximum value, and/or minimum value could be determined for one or more image features across the set. The coefficient of variation (CV) is a measure of relative variability. It is the ratio of the standard deviation to the mean (average). The formula for the coefficient of variation is: Coefficient of Variation=(Standard Deviation/Mean)*100.

Variance (Var) measures how far a data set is spread out. The technical definition is "The average of the squared differences from the mean." is the purpose is to provide a very general idea of the spread in the data. A value of zero means that there is no variability. The following is a list of example set characteristics:

Number of Images is the number of images in a single training set for which the set characteristics are being calculated.

The cv_file_sizes is the coefficient of variation for the file size of images in a single training set.

The max_file_size in the training set.

The min_file_size in the training set.

CV_blur is the coefficient of variation for the blur value of images in a single training set.

CV_exposure is the coefficient of variation for the exposure level of images in a single training set.

CV_noise is the coefficient of variation for the noise of images in a single training set.

CV_roll is the coefficient of variation for the face roll of images in a single training set.

CV_yaw is the coefficient of variation for the face yaw of images in a single training set.

CV_smile intensity is the coefficient of variation for the smile intensity of images in a single training set.
CV_eyeLeftBottom_x is the coefficient of variation for the eyeLeftBottom_x value of images in a single training set.
CV_eyeLeftBottom_y is the coefficient of variation for the eyeLeftBottom_y value of images in a single training set.
CV_eyeLeftInner_x is the coefficient of variation for the eyeLeftInner_x value of images in a single training set.
CV_eyeLeftInner_y is the coefficient of variation for the eyeLeftInner_y value of images in a single training set.
CV_eyeLeftOuter_x is the coefficient of variation for the eyeLeftOuter_x value of images in a single training set.
CV_eyeLeftOuter_y is the coefficient of variation for the eyeLeftOuter_y value of images in a single training set.
CV_eyeLeftTop_x is the coefficient of variation for the eyeLeftTop_x value of images in a single training set.
CV_eyeLeftTop_y is the coefficient of variation for the eyeLeftTop_y value of images in a single training set.
CV_eyeRightBottom_x is the coefficient of variation for the eyeRightBottom_x value of images in a single training set.
CV_eyeRightBottom_y is the coefficient of variation for the eyeRightBottom_y value of images in a single training set.
CV_eyeRightInner_x is the coefficient of variation for the eyeRightInner_x value of images in a single training set.
CV_eyeRightInner_y is the coefficient of variation for the eyeRightInner_y value of images in a single training set.
CV_eyeRightOuter_x is the coefficient of variation for the eyeRightOuter_x value of images in a single training set.
CV_eyeRightOuter_y is the coefficient of variation for the eyeRightOuter_y value of images in a single training set.
CV_eyeRightTop_x is the coefficient of variation for the eyeRightTop_x value of images in a single training set.
CV_eyeRightTop_y is the coefficient of variation for the eyeRightTop_y value of images in a single training set.
CV_eyebrowLeftInner_x is the coefficient of variation for the eyebrowLeftInner_x value of images in a single training set.
CV_eyebrowLeftInner_y is the coefficient of variation for the eyebrowLeftInner_y value of images in a single training set.
CV_eyebrowLeftOuter_x is the coefficient of variation for the eyebrowLeftOuter_x value of images in a single training set.
CV_eyebrowLeftOuter_y is the coefficient of variation for the eyebrowLeftOuter_y value of images in a single training set.
CV_eyebrowRightInner_x is the coefficient of variation for the eyebrowRightInner_x value of images in a single training set.
CV_eyebrowRightInner_y is the coefficient of variation for the eyebrowRightInner_y value of images in a single training set.
CV_eyebrowRightOuter_x is the coefficient of variation for the eyebrowRightOuter_x value of images in a single training set.
CV_eyebrowRightOuter_y is the coefficient of variation for the eyebrowRightOuter_y value of images in a single training set.
CV_mouthLeft_x is the coefficient of variation for the mouthLeft_x value of images in a single training set.
CV_mouthLeft_y is the coefficient of variation for the mouthLeft_y value of images in a single training set.
CV_mouthRight_x is the coefficient of variation for the mouthRight_x value of images in a single training set.
CV_mouthRight_y is the coefficient of variation for the mouthRight_y value of images in a single training set.
CV_noseLeftAlarOutTip_x is the coefficient of variation for the noseLeftAlarOutTip_x value of images in a single training set.
CV_noseLeftAlarOutTip_y is the coefficient of variation for the noseLeftAlarOutTip_y value of images in a single training set.
CV_noseLeftAlarTop_x is the coefficient of variation for the noseLeftAlarTop_x value of images in a single training set.
CV_noseLeftAlarTop_y is the coefficient of variation for the noseLeftAlarTop_y value of images in a single training set.
CV_noseRightAlarOutTip_x is the coefficient of variation for the noseRightAlarOutTip_x value of images in a single training set.
CV_noseRightAlarOutTip_y is the coefficient of variation for the noseRightAlarOutTip_y value of images in a single training set.
CV_noseRightAlarTop_x is the coefficient of variation for the noseRightAlarTop_x value of images in a single training set.
CV_noseRightAlarTop_y is the coefficient of variation for the noseRightAlarTop_y value of images in a single training set.
CV_noseRootLeft_x is the coefficient of variation for the noseRootLeft_x value of images in a single training set.
CV_noseRootLeft_y is the coefficient of variation for the noseRootLeft_y value of images in a single training set.
CV_noseRootRight_x is the coefficient of variation for the noseRootRight_x value of images in a single training set.
CV_noseRootRight_y is the coefficient of variation for the noseRootRight_y value of images in a single training set.
CV_noseTip_x is the coefficient of variation for the noseTip_x value of images in a single training set.
CV_noseTip_y is the coefficient of variation for the noseTip_y value of images in a single training set.
CV_pupilLeft_x is the coefficient of variation for the pupilLeft_x value of images in a single training set.
CV_pupilLeft_y is the coefficient of variation for the pupilLeft_y value of images in a single training set.
CV_pupilRight_x is the coefficient of variation for the pupilRight_x value of images in a single training set.
CV_pupilRight_y is the coefficient of variation for the pupilRight_y value of images in a single training set.
CV_underLipBottom_x is the coefficient of variation for the underLipBottom_x value of images in a single training set.
CV_underLipBottom_y is the coefficient of variation for the underLipBottom_y value of images in a single training set.
CV_underLipTop_x is the coefficient of variation for the underLipTop_x value of images in a single training set.
CV_underLipTop_y is the coefficient of variation for the underLipTop_y value of images in a single training set.
CV_upperLipBottom_x is the coefficient of variation for the upperLipBottom_x value of images in a single training set.

CV_upperLipBottom_y is the coefficient of variation for the upperLipBottom_y value of images in a single training set.

CV_upperLipTop_x is the coefficient of variation for the upperLipTop_x value of images in a single training set.

CV_upperLipTop_y is the coefficient of variation for the upperLipTop_y value of images in a single training set.

Mean values can be calculated for different image values across the training set. The mean_eye_occlusion across images in the training set can be calculated. The mean_forehead_occlusion across images in the training set can be calculated. The mean_mouth_occlusion across images in the training set can be calculated. The mean_hair_invisible across images in the training set can be calculated. The mean_makeup_eye across images in the training set can be calculated. The mean_makeup_lip across images in the training set can be calculated.

The portion_noglasses across images in the training set can be calculated. The portion_readglasses across images in the training set can be calculated. The portion_sunglasses across images in the training set can be calculated.

Variances can be calculated for different image characteristics. The var_rectangle_height measures the variance of rectangle height surrounding the face of the person in an image. The var_rectangle_width measures the variance of rectangle width surrounding the face of the person in an image. The var_rectangle_size measures the variance of rectangle area surrounding the face of the person in an image. The var_emotion_anger measures the variance of anger value of the person in an image. The var_emotion_contempt measures the variance of contempt value of the person in an image. The var_emotion_disgust measures the variance of disgust value of the person in an image. The var_emotion_fear measures the variance of fear value of the person in an image. The var_emotion_happiness measures the variance of happiness value of the person in an image. The var_emotion_neutral measures the variance of neutral emotion value of the person in an image. The var_emotion_sadness measures the variance of sadness value of the person in an image. The var_emotion_surprise measures the variance of surprise value of the person in an image.

The model testing component 250 trains an object recognition model using a training set for a person. As mentioned, training set characteristics have been determined previously. A validation set is then used to calculate a performance measure 245 (see FIG. 4) for the model. For example, a confidence score could be calculated for each validation image. In order to calculate a confidence score, a validation image is input to the object recognition model 260. The confidence score is an output generated by the object recognition model 260 after evaluating the validation image. The confidence score is a measure of how confident the model is in its determination. The performance measure could be the average confidence score output by the model across all validation images for a person. The performance measure can then be associated with each of the training set characteristics to form a series of (x, y) pairs that can be used to build improvement model 254, where x is the set characteristic value and y is the performance measure. Each set characteristic can be expressed as an (x, y) pair.

The improvement model builder 252 builds the improvement model 254. In one aspect, the improvement model 254 is a random decision forest. The random decision forest is a combination of individual decision trees. The individual decision trees can be built using randomly generated subsets of available set characteristics. The individual decision trees can be combined into a random decision forest. The decision forest can be limited to five levels with end nodes having five or more samples, in one aspect.

The improvement model 254 calculates a predicted performance given a training set of images. The improvement model 254 can use set characteristics of the training images to predict the performance. The model can be walked according to the set characteristics until an end node in the model is reached. The end node will include the predicted performance.

The improvement model can select a characteristic within the path to the end node that, if changed, will improve the predicted performance of the object recognition model 260. In one aspect, the characteristic that will cause the largest increase is selected. In another aspect, only certain characteristics that are better able to be acted on by a user are selectable. In this instance, the selectable characteristic likely to cause the greatest increase in predicted performance is selected.

The recommendation interface 256 outputs a suggestion to add an image of a person or object having a characteristic that will improve the model performance. An example interface is shown in FIG. 5.

Figure 5:
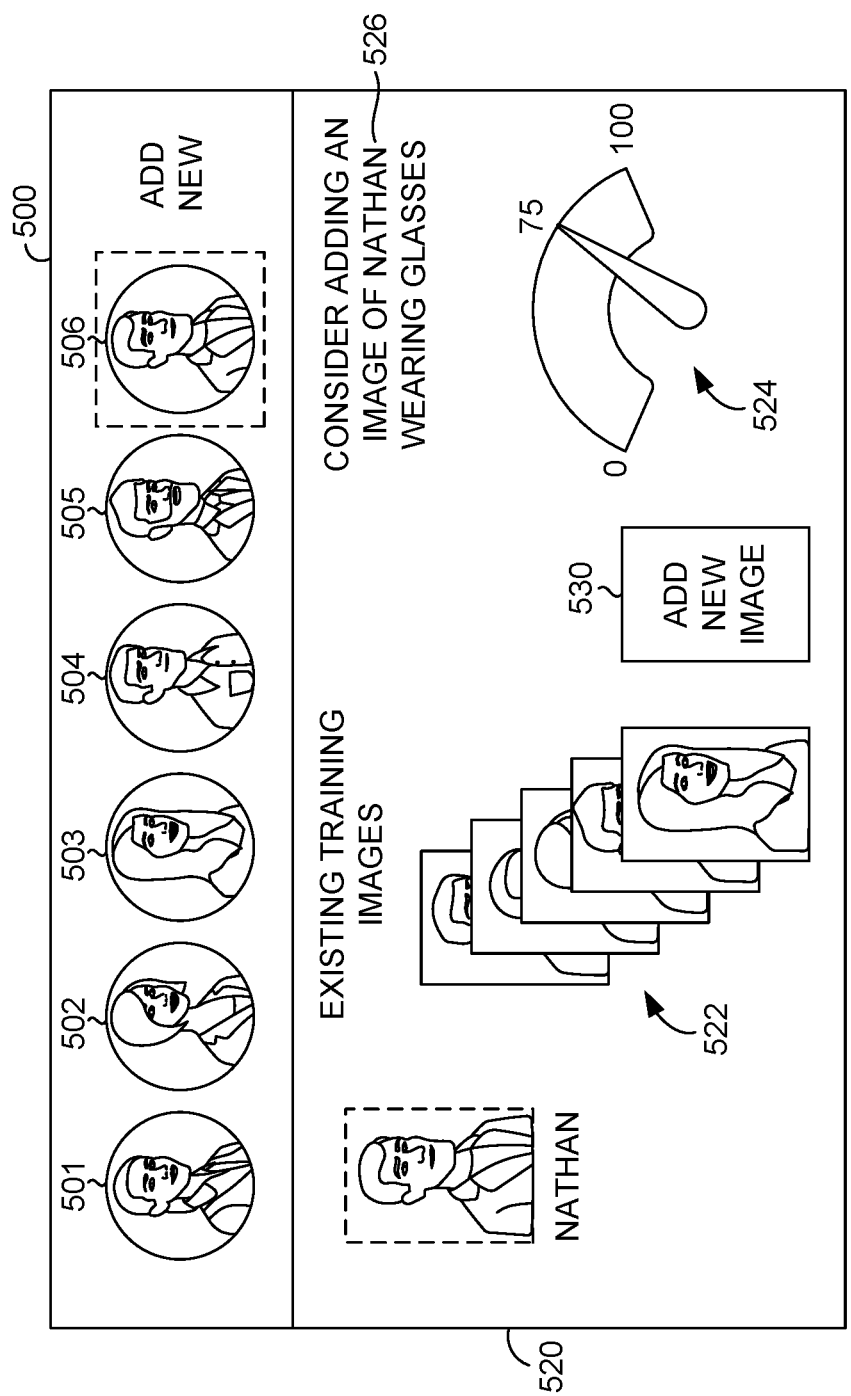
FIG. 5 is a diagram depicting a user interface providing guidance to improve an object recognition model, in accordance with an aspect of the technology described herein.

Turning now to FIG. 5, a custom facial recognition interface 500 is shown. The custom facial recognition interface 500 includes a person selection interface 510. The person selection interface 510 allows the user to select an existing person record by selecting an image (501, 502, 503, 504, 505, and 506) of a person in the system or create a new person record by selecting the "new record" button 514. Here, the interface 500 shows the result of selecting the existing record button 506.

The user record 520 for Nathan includes a link 522 to images used as training data previously. In one aspect, selecting the link 522 brings up a new interface (not shown) that shows thumbnails of existing training images along with other information about the images. The user record 520 also includes a performance score 524 for the currently trained model. Here the performance score is 75. The scale indicator shows that scores can range from zero to 100. The suggestion 526 explains that uploading an image of Nathan wearing glasses would improve the accuracy with which the object recognition model recognizes Nathan in images. The suggestion 526 can be calculated using the improvement model described previously.

Selecting the "add new training image" icon 530 can open a new interface (not shown) through which new training images can be uploaded. In one aspect, dragging an image onto the icon 530 will automatically add the image to the training images. The image dragged onto the icon 530 may automatically be labeled as depicting Nathan. In one aspect, when multiple people appear in an image then the user is asked to select Nathan. This is just one example of a suitable interface for making suggestions that will improve the performance of the object recognition model.

Figure 6:
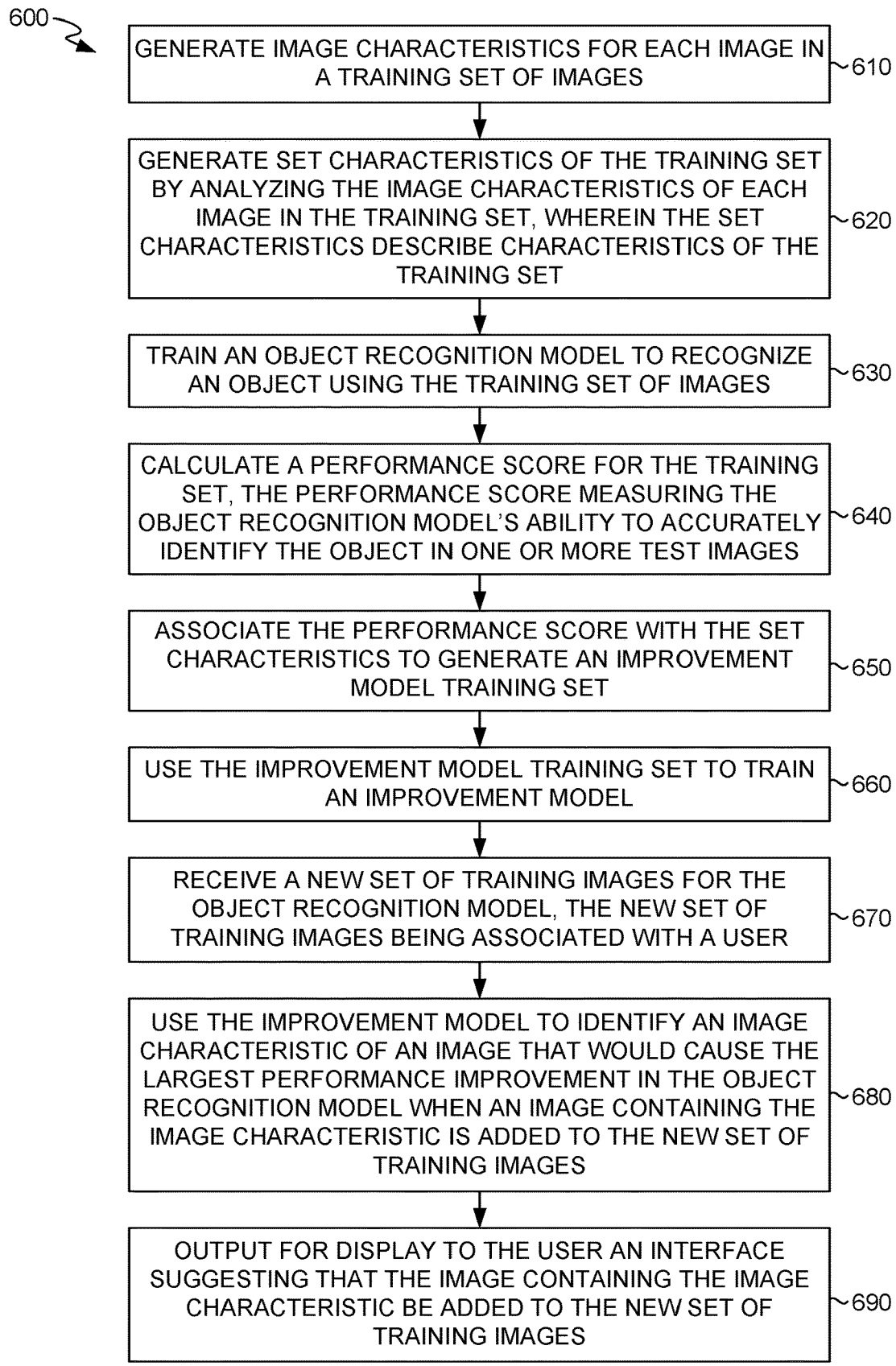
FIGS. 6-8 are diagrams depicting flow charts showing a method of improving an object recognition model, in accordance with an aspect of the technology described herein.

Turning now to FIG. 6, a flowchart showing a method 600 of improving an object recognition system is provided, according to an aspect of the technology described herein. Method 600 may be performed by a model improvement system, such as system 240 described previously.

At step 610, image characteristics for each image in a training set of images are generated. A trained image recognition system can identify the image characteristics, which can also be described as features. A feature or characteristic can be many different things, including points of interest on the face, facial landmarks, and/or image meta data (e.g., size, resolution). The features can be identified using different methods, including machine learning. Different characteristics that can be identified have been described previously with reference to the feature extractor 246.

At step 620, set characteristics of the training set are generated by analyzing the image characteristics of each image in the training set. The set characteristics describe characteristics of the training set. Set characteristics and calculations used to build the set characteristics have been described previously with reference to the set characteristics component 248.

At step 630, an object recognition model is trained to recognize an object using the training set of images. At a high level, an object recognition system is trained to recognize images by feeding it labeled images of an object to be recognized. Once trained, the system can recognize objects in unlabeled images. As an example, the description of FIG. 3 illustrates training a particular type of model.

At step 640, a performance score for the training set is calculated. The performance score measures the object recognition model's ability to accurately identify the object in one or more validation images. For example, a confidence score could be calculated for each validation image. In order to calculate a confidence score, a validation image is input to the object recognition model 260. The confidence score is an output generated by the object recognition model 260 after evaluating the validation image. The confidence score is a measure of how confident the model is in its determination. The performance measure could be the average confidence score output by the model across all validation images for a person.

At step 650, the performance score is associated with the set characteristics to generate an improvement model training set. For example, each individual set characteristic could be associated with the performance score. The improvement model training set will include set characteristics generated from different sets of training images and corresponding validation images.

At step 660, the improvement model training set is used to train an improvement model. In one aspect, the improvement model is a random decision forest. The random decision forest is a combination of individual decision trees. The individual decision trees can be built using randomly generated subsets of available set characteristics. The individual decision trees can be combined into a random decision forest. The decision forest can be limited to five levels with end nodes having five or more samples, in one aspect.

At step 670, a new set of training images for the object recognition model is received. The new set of training images is associated with a user. The object recognition model may be a custom facial recognition model the user is training to recognize family and friends in images.

At step 680, the improvement model is used to select an image characteristic that would cause a performance improvement in the object recognition model when an image containing the image characteristic is added to the new set of training images. The improvement model calculates a predicted performance given a training set of images. The improvement model can use set characteristics of the training images to predict the performance. The model can be walked according to the set characteristics until an end node in the model is reached. The end node will specify the predicted performance.

The improvement model can select a characteristic within the path to the end node that, if changed, will improve the predicted performance of the object recognition model 260. In one aspect, the characteristic that will cause the largest increase is selected. In another aspect, only certain characteristics that are better able to be acted on by a user are selectable. In this instance, the selectable characteristic likely to cause the greatest increase in predicted performance is selected.

At step 690, a user interface suggesting that the image containing the image characteristic be added to the new set of training images is output for display. FIG. 5 shows a suitable interface for providing a guidance the user can follow to improve the training images.

Figure 7:
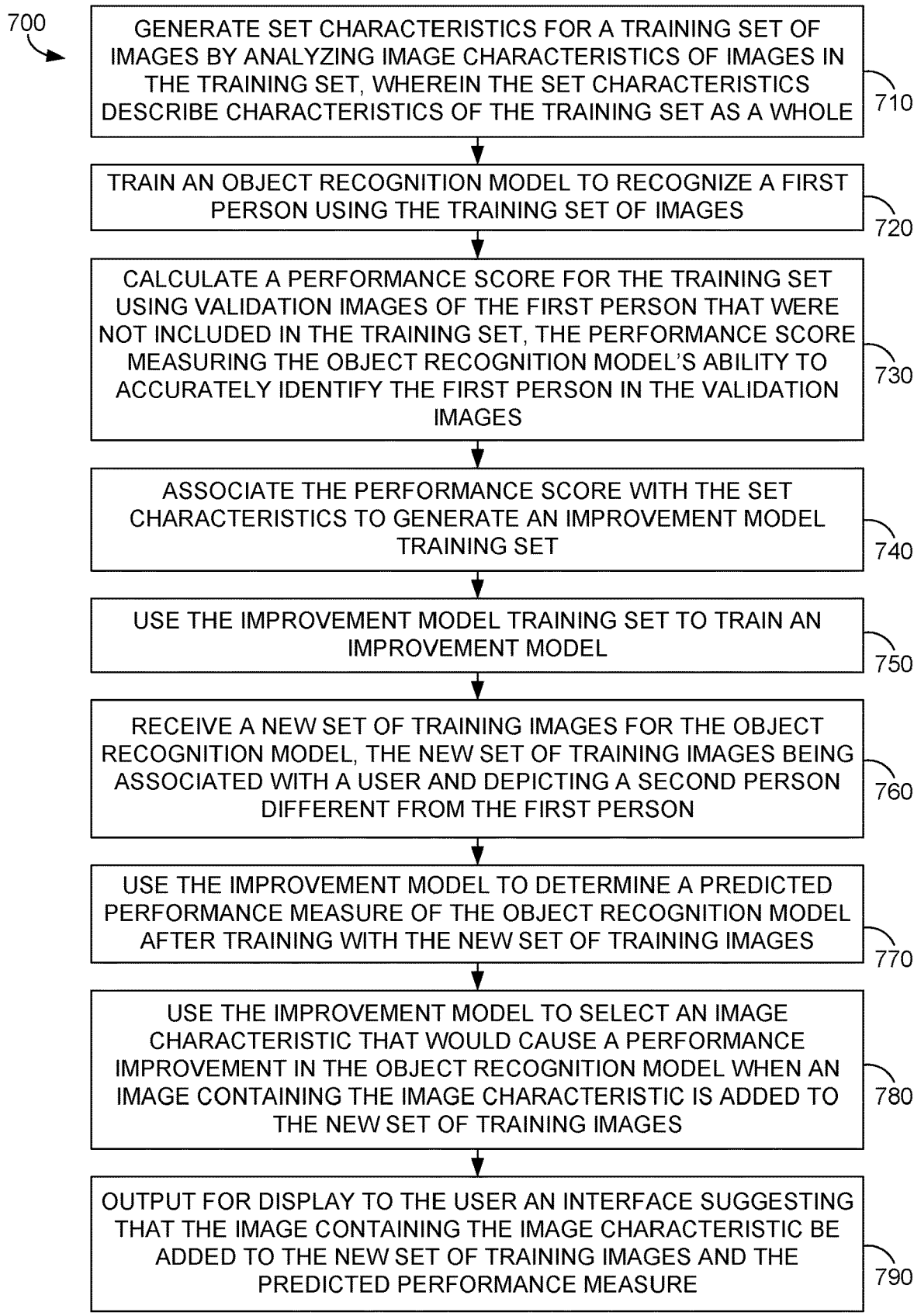

Turning now to FIG. 7, a method 700 of improving an object recognition model is provided. Method 700 may be performed by a model improvement system, such as system 240 described previously.

At step 710, set characteristics for a training set of images are generated by analyzing image characteristics of images in the training set. The set characteristics describe characteristics of the training set as a whole. As an initial step, the characteristics of individual images within the set can be determined. A trained image recognition system can identify the image characteristics, which can also be described as features. A feature or characteristic can be many different things including points of interest on the face, facial landmarks, and/or image meta data (e.g., size, resolution). The features can be identified using different methods, including machine learning. Different characteristics that can be identified have been described previously with reference to the feature extractor 246.

Set characteristics and calculations used to build the set characteristics have been described previously with reference to the set characteristics component 248.

At step 720, an object recognition model is trained to recognize a first person using the training set of images. At a high level, an object recognition system is trained to recognize images by feeding it labeled images of an object to be recognized. Once trained, the system can recognize objects in unlabeled images. As an example, the description of FIG. 3 illustrates training a particular type of model.

At step 730, a performance score for the training set is calculated using validation images of the first person that were not included in the training set. The performance score measures the object recognition model's ability to accurately identify the first person in the validation images. For example, a confidence score could be calculated for each validation image. In order to calculate a confidence score, a validation image is input to the object recognition model 260. The confidence score is an output generated by the object recognition model 260 after evaluating the validation image. The confidence score is a measure of how confident the model is in its determination. The performance measure could be the average confidence score output by the model across all validation images for a person.

At step 740, the performance score is associated with the set characteristics to generate an improvement model training set, as described previously. For example, each individual set characteristic could be associated with the performance score. The improvement model training set will include set characteristics generated from different sets of training images and corresponding validation images.

At step 750, the improvement model training set is used to train an improvement model. The improvement model can be a random decision forest, as described previously. In one aspect, the improvement model is a random decision forest. The random decision forest is a combination of individual decision trees. The individual decision trees can be built using randomly generated subsets of available set characteristics. The individual decision trees can be combined into a random decision forest. The decision forest can be limited to five levels with end nodes having five or more samples, in one aspect.

At step 760, a new set of training images for the object recognition model is received. The new set of images have not been tested against validation images. The new set of training images is associated with a user and depicts a second person different from the first person.

At step 770, the improvement model is used to determine a predicted performance measure of the object recognition model after training with the new set of training images. The improvement model calculates a predicted performance given a training set of images. The improvement model can use set characteristics of the training images to predict the performance. The model can be walked according to the set characteristics until an end node in the model is reached. The end node will specify the predicted in performance.

At step 780, the improvement model is used to select an image characteristic that would cause a performance improvement in the object recognition model when an image containing the image characteristic is added to the new set of training images. The improvement model can select a characteristic within the path to the end node that, if changed, will improve the predicted performance of the object recognition model. In one aspect, the characteristic that will cause the largest increase is selected. In another aspect, only certain characteristics that are better able to be acted on by a user are selectable. In this instance, the selectable characteristic likely to cause the greatest increase in predicted performance is selected.

At step 790, an interface suggesting that the image containing the image characteristic be added to the new set of training images and the predicted performance measure is output for display. FIG. 5 shows a suitable interface for providing a guidance the user can follow to improve the training images.

Figure 8:
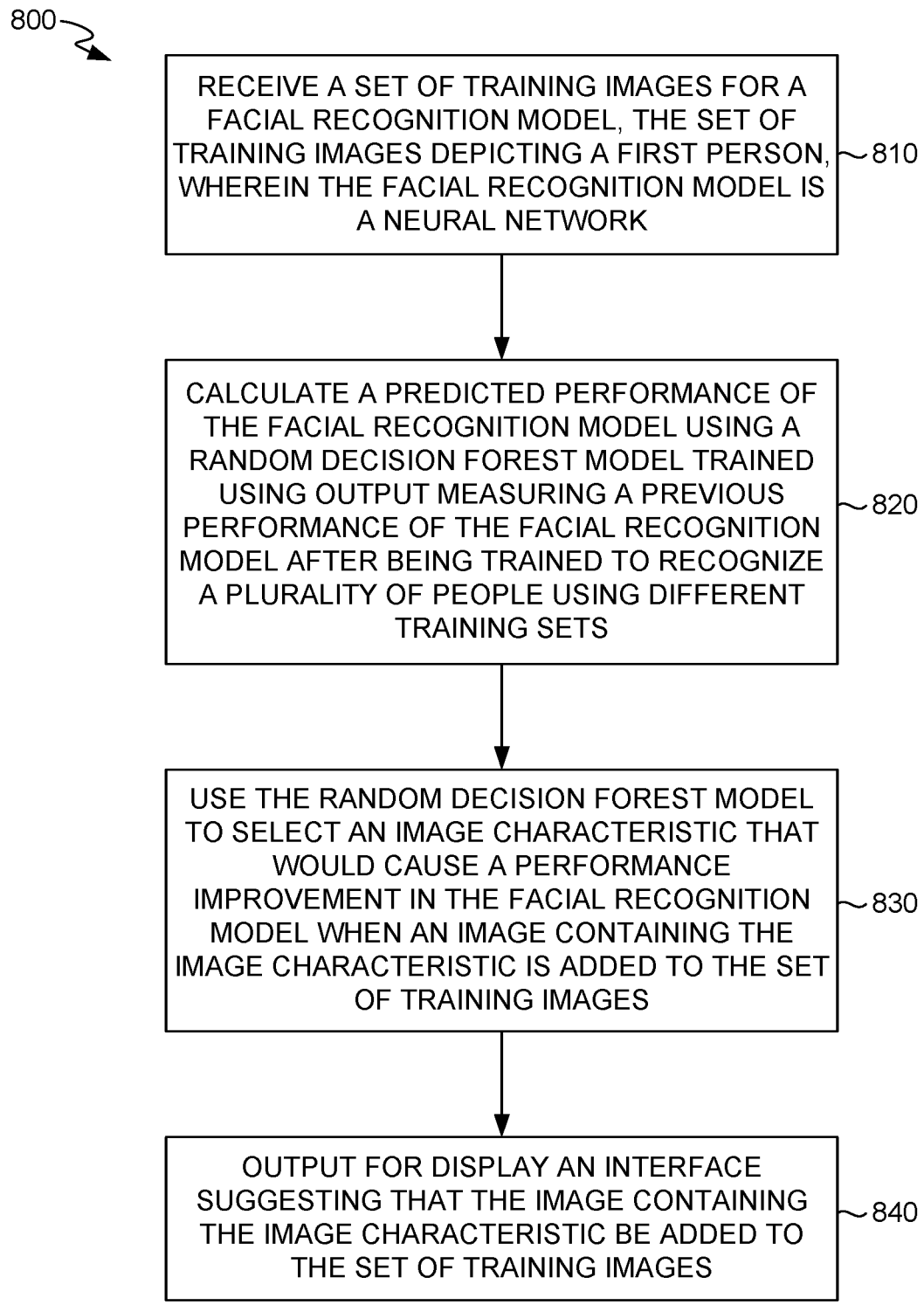

Turning now to FIG. 8, a method 800 of improving an object recognition model is provided. Method 800 may be performed by a model improvement system, such as system 240 described previously.

At step 810, a set of training images for a facial recognition model is received. The set of training images depict a first person. The facial recognition model is a neural network. At a high level, an object recognition system is trained to recognize images by feeding it labeled images of an object to be recognized. Once trained, the system can recognize objects in unlabeled images.

The set of training images can be analyzed to build set characteristics as described previously. In brief, image characteristics are determined and then processed collectively to arrive at set characteristics. The set characteristics are used as input to the improvement model.

At step 820, a predicted performance of the facial recognition model is calculated using a random decision forest model trained using output measuring a previous performance of the facial recognition model after being trained to recognize a plurality of people using different training sets. The set characteristics of the new training images are used as input to the random decision forest model. The random decision forest can use set characteristics of the new training images to predict the performance. The model nodes can be walked until an end node in the model is reached. The end node will specify the predicted in performance.

At step 830, the random decision forest model is used to select an image characteristic that would cause a performance improvement in the facial recognition model when an image containing the image characteristic is added to the set of training images. The random decision forest can select a set characteristic within the path to the end node that, if changed, will improve the predicted performance of the object recognition model. In one aspect, the characteristic that will cause the largest increase is selected. In another aspect, only certain characteristics that are better able to be acted on by a user are selectable. In this instance, the selectable characteristic likely to cause the greatest increase in predicted performance is selected.

At step 840, an interface suggesting that the image containing the image characteristic be added to the set of training images is output for display. FIG. 5 shows a suitable interface for providing a guidance the user can follow to improve the training images.

Exemplary Operating Environment

Figure 9:
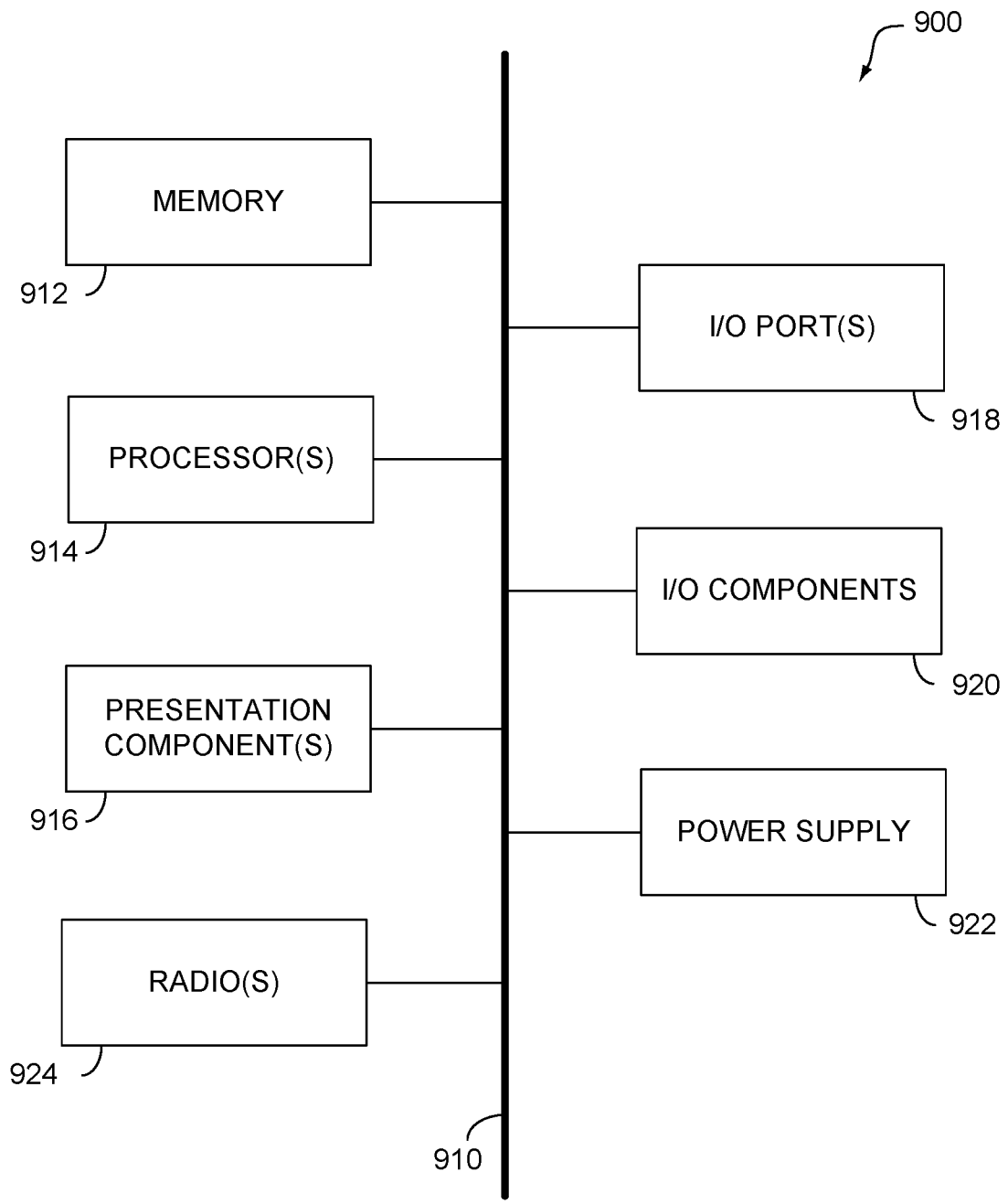
FIG. 9 is a block diagram of an exemplary computing environment suitable for use in implementing an aspect of the technology described herein.

Referring to the drawings in general, and to FIG. 9 in particular, an exemplary operating environment for implementing aspects of the technology described herein is shown and designated generally as computing device 900. Computing device 900 is but one example of a suitable computing environment and is not intended to suggest any limitation as to the scope of use of the technology described herein. Neither should the computing device 900 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including data center based servers, handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, and an illustrative power supply 922. Bus 910 represents what may be one or more busses (such as an address bus, data bus, or a combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, optical-disc drives, etc. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, vibrating component, etc. I/O ports 918 allow computing device 900 to be logically coupled to other devices, including I/O components 920, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 900. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include a radio 924. The radio 924 transmits and receives radio communications. The computing device may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of improving a performance of an object recognition model comprising:
   training the object recognition model to recognize an object using a set of training images;
   calculating a performance score measuring the object recognition model's ability to accurately identify the object in one or more validation images;
   selecting an image characteristic that would cause a performance improvement in the object recognition model when a new image containing the image characteristic is added to a new set of training images;

upon selecting the image characteristic, outputting for display to a user an interface asking the user to generate a new training image with a label by selecting an area of the new training image that depicts the object associated with the label, wherein the user selects the new training image from a set of new training images including the image characteristic displayed in a user interface;

adding the new training image to the new set of training images; and retraining the object recognition model using the new set of training images.

2. The method of claim 1, wherein the method further comprises:

generating image characteristics for each image in the set of training images;

generating set characteristics for the set of training images by analyzing the image characteristics of each image in the set of training images, wherein the set characteristics describe characteristics of the set of training images;

associating the performance score with the set characteristics to generate an improvement model training set;

using the improvement model training set to train an improvement model; and using the improvement model to select the image characteristic.

3. The method of claim 2, wherein the set characteristics comprise a coefficient of variance for the image characteristics of images in the set of training images.

4. The method of claim 2, wherein the improvement model is a random decision forest model.

5. The method of claim 2, wherein the method further comprises generating a new set of characteristics for the new set of training images, and wherein the improvement model uses the new set of characteristics to select the image characteristic.

6. The method of claim 5, wherein the method further comprises calculating a performance measure of the object recognition model using the new set of characteristics as input to the improvement model.

7. The method of claim 6, wherein the improvement model training set includes pairs of set characteristic values and the performance measure.

8. A method for improving a performance of an object recognition model comprising:

training an object recognition model to recognize a first person using a set of training images;

calculating a performance score for the set of training images using validation images of the first person that were not included in the set of training images, the performance score measuring the object recognition model's ability to accurately identify the first person in the validation images;

selecting an image characteristic that would cause a performance improvement in the object recognition model when a new image containing the image characteristic is added to a new set of training images;

upon selecting the image characteristic, outputting for display to a user interface a request that the new image containing the image characteristic be labeled, wherein the image characteristic includes a feature of the first person extracted by the object recognition model;

receiving from the user interface a label for the new image; and adding the new image and the label to the new set of training images.

9. The method of claim 8, further comprising generating set characteristics for the set of training images by analyzing image characteristics of images in the set of training images, wherein the set characteristics describe characteristics of the set of training images as a whole.

10. The method of claim 9, wherein the method further comprises:

associating the performance score with the set characteristics to generate an improvement model training set;

using the improvement model training set to train an improvement model;

receiving the new set of training images for the object recognition model, the new set of training images depicting a second person different from the first person; and using the improvement model to determine a predicted performance measure of the object recognition model after training with the new set of training images.

11. The method of claim 10, wherein the method further comprises training the object recognition model to recognize the second person using the new set of training images and the new image.

12. The method of claim 9, wherein a set characteristic comprises a coefficient of variance for smile intensity of images in the set of training images.

13. The method of claim 9, wherein a set characteristic comprises a coefficient of variance for exposure of images in the set of training images.

14. The method of claim 9, wherein a set characteristic comprises a coefficient of variance for a facial landmark in images in the set of training images.

15. The method of claim 9, wherein the image characteristic is limited to characteristics that are identifiable to a user looking at an image.

16. The method of claim 8, wherein the feature of the object extracted by the object recognition model includes at least one of:

a land mark;

a point of interest; and image meta data.

17. A computer-storage media having computer-executable instructions embodied thereon that when executed by a computer processor cause a computing device to perform a method, the method comprising:

receiving a new set of training images for a facial recognition model, the new set of training images depicting a first person;

selecting an image characteristic that would cause a performance improvement in the facial recognition model when a new image containing the image characteristic is added to the new set of training images;

upon selecting the image characteristic, outputting for display to a user an interface asking the user to select a new training image that depicts the image characteristic of the first person;

in response to receive a selecting of the new training image by the user, adding the new training image to the new set of training images; and retraining the facial recognition model using the new set of training images.

18. The media of claim 17, wherein the method further comprises:

generating image characteristics for each image in a set of training images;

generating set characteristics for the set of training images by analyzing the image characteristics of each image in the set of training images, wherein the set characteristics describe characteristics of the set of training images;

training the facial recognition model to recognize a face using the set of training images;

calculating a performance score for the set of training images, the performance score measuring the facial recognition model's ability to accurately identify the face in one or more validation images;

associating the performance score with the set characteristics to generate an improvement model training set;

using the improvement model training set to train a random decision forest model; and using the random decision forest model to identify the image characteristic.

19. The media of claim 18, wherein the improvement model training set includes pairs of set characteristic values and the performance score.

20. The media of claim 18, wherein the method further comprises generating a new set of characteristics for the new set of training images, and wherein the random decision forest model uses the new set of characteristics to select the image characteristic.

* * * * *